United States Patent [19]

Wörner et al.

[11] Patent Number: 4,927,608
[45] Date of Patent: May 22, 1990

[54] DEVICE FOR CATALYTIC CLEANING OF MOTOR VEHICLE EXHAUST GASES

[75] Inventors: Siegfried Wörner, Esslingen; Peter Zacke, Albertshausen; Georg Wirth, Kirchheim, all of Fed. Rep. of Germany

[73] Assignee: J. Eberspächer, Esslingen, Fed. Rep. of Germany

[21] Appl. No.: 139,904

[22] Filed: Dec. 31, 1987

[30] Foreign Application Priority Data

Jan. 2, 1987 [DE] Fed. Rep. of Germany ....... 3700070

[51] Int. Cl.$^5$ .................................................. F01N 3/15
[52] U.S. Cl. .................................. 422/179; 422/180; 422/190; 422/193; 422/220; 422/221; 422/222; 60/299; 60/301
[58] Field of Search ............... 422/171, 176, 177, 179, 422/180, 190, 193, 211, 220, 221, 222; 60/299, 301

[56] References Cited

U.S. PATENT DOCUMENTS

| 3,978,567 | 9/1976 | Vroman | 422/171 X |
| 4,004,887 | 1/1977 | Stormont | 422/179 |
| 4,004,888 | 1/1977 | Musall et al. | 422/179 |
| 4,264,561 | 4/1981 | Goedicke | 422/179 X |
| 4,285,909 | 8/1981 | Mizusawa et al. | 422/180 X |
| 4,344,922 | 8/1982 | Santiago et al. | 422/179 |
| 4,667,386 | 5/1987 | Enomoto et al. | 422/177 X |
| 4,775,518 | 10/1988 | Abthoff et al. | 422/177 X |

Primary Examiner—Christine M. Nucker
Assistant Examiner—Lynn M. Kummert
Attorney, Agent, or Firm—McGlew & Tuttle

[57] ABSTRACT

A device for the catalytic cleaning of motor vehicle exhaust gases, comprises a housing having a central region with at least one monolith of a material such as a ceramic, an inner shell is arranged within the housing at least in places. The inner shell extends into at least one part of the monolith containing region of the housing and leads up to the monolith and is secured there. The end of the inner sheel at the end of the housing is free for thermal expansion motions relative to the housing.

10 Claims, 2 Drawing Sheets

DEVICE FOR CATALYTIC CLEANING OF MOTOR VEHICLE EXHAUST GASES

FIELD AND BACKGROUND OF THE INVENTION

This invention relates in general to catalytic cleaning devices for motor vehicle exhausts and in particular to a new and useful catalytic cleaning device for attachment to a motor vehicle exhaust pipe which has a transition portion of a housing with an inner shell therein.

Similar known devices include an inner shell which extends along the outer circumference of a monolith and a spacer matting is arranged between the housing and the inner shell. The not very precise positioning of the inner shell by the spacer matting is considered to be a disadvantage.

Furthermore, it is known that the inner shell may extend along the inside of the housing in the region containing the monolith, and the spacer matting can be arranged between the inner shell and the monolith, whereby the inner shell is joined to the housing in the connection regions, and not in the monolith containing region. Again, the inner shell is positioned with insufficient accuracy in the monolith containing region.

Finally, it is known that the inner shell can be placed in the transitional regions and welded to the housing in each particular connection region. At the transitional region, each end of the inner shell engages with a ring, being able to move relative to the lengthwise direction, while the other axial end region of the ring is secured to the housing. In this way, the sliding fit between the part of the inner shell and the ring is located in a zone with intense admission of exhaust gas. Furthermore, the retention of the monolith solely by the spacer matting between the housing and the monolith is not sufficiently stable in its positioning.

SUMMARY OF THE INVENTION

The invention provides a device for treating exhaust gases having a secure positioning of the monolith in a direction extending transversely to the lengthwise span of the housing and have a long-lasting reliable absorption of lengthwise thermal expansion differences between the housing and the inner shell.

Thus, the inner shell of the invention device is fixed to the monolith containing region of the housing, and the relative motions between the housing and the inner shell caused by variable thermal expansions are equalized in the connection region. The latter effect is self evident.

While the spacer matting is arranged in the space between the housing and the monolith, this should not be taken to mean that the spacer matting necessarily rests against the housing with its outside and against the inner shell with its inside. Instead, for example, the inner shell may, but need not, lie on the outside of the spacer matting between this and the housing, or inside the spacer matting between this and the monolith, especially in a zonewise arrangement. The phrase "the inner shell is brought up to the housing" does not necessarily imply a direct bearing of the inner shell against the housing in that place. Instead, there may, but need not be a middle layer present there.

Preferably, the inner shell is brought up to the housing only for a relatively short, axial length, and secured to it in this place, but thereafter again stands off from the housing and provides a direct or indirect engagement to secure the monolith. This enhances the positional stability of the retention of the monolith. The inner shell is secured to the housing preferably in a place where a terminal region of the monolith is located.

The inner shell from the direction of the particular transitional region may extend across the entire length of the monolith. However, it is preferable to terminate the inner shell at a certain distance from the particular end of the monolith, so that two separate pieces of inner shell are obtained, for example, in the case of a monolith arranged in the housing. It is considered to be advantageous to have the terminal region of the parts of the inner shell near the monolith configured with peripherally distributed elastic tongues to secure the monolith, thus providing for the variable thermal expansions between the monolith and the inner shell or the housing, respectively. The tongues are preferably formed by somewhat omega-shaped punch-outs, which enhances the radial elasticity of the tongues yet assures relatively large contact surfaces between the tongues and the monolith, or between the tongues and the outwardly placed spacer matting, which provides an additional pressing force.

The purpose of the inner shell is primarily to remove the housing from the direct influence of the exhaust gas and to keep it cool. This is achieved by a spacing between the inner shell and the housing in the transitional region. However, this effect can be further intensified by arranging an insulating mat between the housing and the inner shell in the transitional region. This insulating mat, in particular, may be a so-called expanding mat of known material which swells up under the action of heat. A combination of metal and ceramic fiber with spring action will also serve the purpose. Moreover, the insulating mat can be protected at its face by a ring, in particular, one of expanding material, or a ring with elastic sealing action, or by a heat-resistant layer, in which case the insulating mat may consist of less durable material. The primary consideration is to protect the insulating mat against a washout or entrainment of material by the exhaust gas pulsations.

It is also preferable to protect the spacer matting against the harmful effects of the exhaust gas pulsations insofar as possible. Favored possibilities for this are an axial offset of the end face(s) of the spacer matting, provision of a sealing ring, especially an elastic one, provision of a casing or a layer at the end face(s) of the spacer matting, or a retraction of the inner shell from the end face(s) of the monolith. Of course, the depicted rings and layers or casings should be made of sufficiently temperature-resistant material. Preferably, the spacer matting should be made of expanding material.

An especially protected and, to a certain extent, natural gas-sealing configuration of the end of the inner shell at the connection region is achieved, by preference, with this end lodged in a sliding fit between the housing and the particular end of the exhaust gas pipe. It is possible to have an additional sealing ring here.

The positional stability of the retention of the monolith can be further enhanced by having at least one elastic intermediate layer between the inner shell and the monolith, which provides for the transmission of larger supporting forces, preferably by increasing the friction, and excludes a direct contact between the metal of the inner shell and the monolith.

Preferably, the device has two or even more monoliths one behind the other in the lengthwise direction of the housing, so that the requisite large catalytically-active surface can be achieved with smallest possible diameter of the device.

In this case, it is preferable to have the inner shell tripartite, the middle part of the shell being secured to the housing by a weld or a crimped connection. The middle part of the inner shell, by preference, has areas for support of the two monoliths at either end, in a configuration such as already described above for the monolith supporting region of the inner shell or the two inner shell pieces, respectively.

If the inner shell is fastened to the housing by welding, a spot weld is preferred as especially efficient in fabrication.

Accordingly it is an object of the invention to provide an improved device for cleaning gases exiting from a vehicle motor exhaust pipe which comprises an outer tubular housing which has one end portion which is adapted to overlie and be connected to the exhaust pipe and which includes a transition portion of gradually increasing diameter extending outwardly of the end portion with a monolithic portion connected to the increased diameter part of the transition portion at the end thereof remote from the transitional portion and which contains a monolith provided with a catalytically active cleaning and which further includes an inner shell of a temperature resistant plate metal spaced inwardly of the interior of the housing with a spacer matting between the interior of the housing and the monolith of a material which permits variable thermal expansion of the housing and the monolith wherein the inner shell has at least a portion extending into the monolith portion which is secured thereto for example, by welding or crimping, the shell having an end portion adjacent the securing elements which are free for thermal expansion.

A further object of the invention is to provide a device for cleaning gases exiting from a motor vehicle exhaust pipe which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
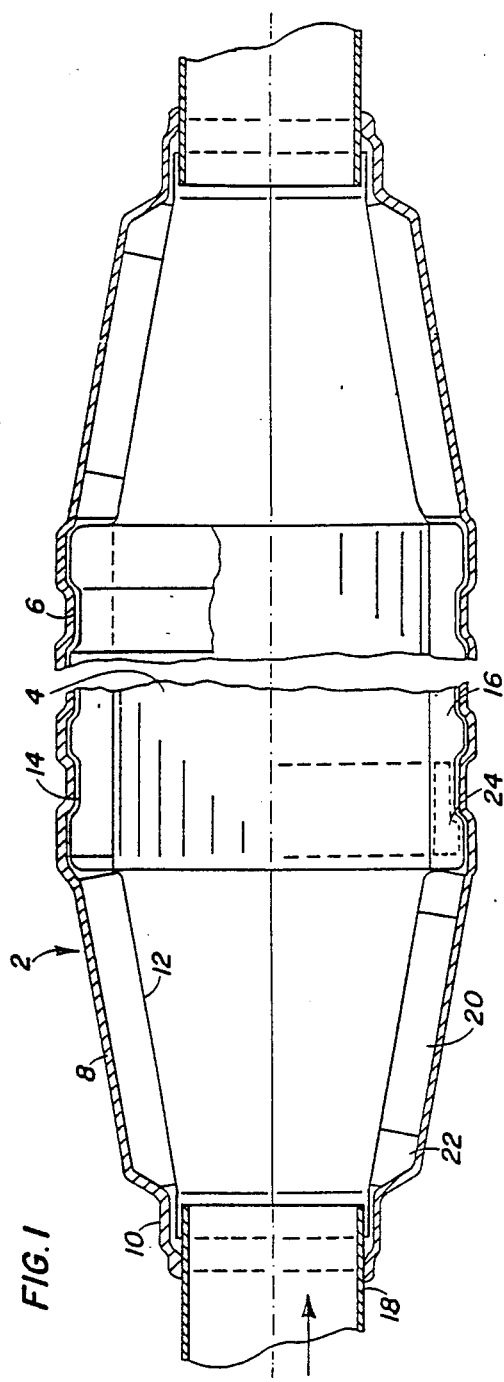
FIG. 1 is an axial sectional view of a catalytic exhaust gas cleaner for motor vehicles with upper and lower cross-sectional portions being indicated with various constructional arrangements in accordance with the invention.

Referring to the drawings in particular the invention embodied therein comprises a device having an outer housing 2 of tubular shape which is adapted to overlie and be connected to an exhaust gas pipe 18 of a vehicle motor exhaust.

In all the examples, there are two monoliths or catalytic elements 4 arranged in axial succession in the housing 2. On each occasion, the drawing shows the left half of the device, which one must visualize as being complemented on the right by a mirror image.

The housing 2 of the device shown in FIG. 1 comprises a middle monolith containing region or containment area 6, which is cylindrical, apart from a number of circumferential crimps, a basically frustum-shaped transitional region 8 adjoining thereto at the right and the left, and a basically cylindrical connection region 10 at the end of each of the transitional regions 8. The housing 2 is of a plate steel and is preferably composed of two half shells along an axial sectioning plane.

From the left connection region 10 depicted in FIG. 1 there extends an inner shell 12 along the transitional region 8 and over at least a portion of the length of the containment area 6. At the left, the inner shell 12 starts somewhat behind the end of the connection region 10 and has here a slight radial gap from the housing 2. The inner shell 12 extends in the transitional region 8 parallel to the housing 2, with a radial gap in the interval therebetween of 2 to 15 mm. At the end of the transitional region 8, the inner shell 12 is curved outward and from this point on rests against the housing 2 at the inside. In at least the left terminal region of the containment area 6, the inner shell 12 is positively locked by an inwardly embossed crimp 14 of the housing 2.

The containment area 6 retains two axially spaced apart monoliths 4. The monolith 4 is cylindrical and comprises a ceramic material, penetrated in the axial direction by a multitude of channels, which are vapor-coated with a catalytically active substance. Between the inner shell 12 and the monolith 4 in the containment area 6 there is a spacer matting 16 with a thickness of 2-15 mm, which terminates on the left somewhat before the end faces of the monolith 4. The distance of the inner shell 12 from the housing 2 at the transition to the containment area 6 is chosen to be such that the inner shell 12 has a curved portion with an end face which slightly overlaps the end faces of the monolith 4 at the margin. In this way, the monolith 4 is axially supported and a certain sealing against flow past the monolith 4 is created.

From the left side, the end of an exhaust gas pipe 18 is inserted into the connection region 10, protruding into the end of the inner shell 12 with a slight play. The exhaust gas pipe 18 is welded to the connection region 10 at the outside. The left end of the inner shell 12 therefore protrudes into an annular slot between the end of the exhaust gas pipe 18 and the connection region 10, so that an opportunity is created for axial expansion and contraction of the inner shell 12 and a certain labyrinth-type sealing is created against propagation of the exhaust gas pulsations into the space between the housing 2 and the inner shell 12.

In the transitional region 8 there is a peripheral insulating mat 20 between the housing 2 and the inner shell 12. This can be additionally protected at the left or the right by a ring 22 of heat-expanding material (FIG. 1, bottom) or by a layer 24 of heat-resistant textile (FIG. 2, top), embracing the end face. The same is true of the spacer matting 16 (cf. FIG. 2, bottom; and FIG. 1, bottom.) The ring 22 preferably comprises a pressed, heat-resistant knitted or woven wire fabric, which may be interwoven or jacketed with heat-resistant mineral fibers. The rings 22 can be configured as sealing rings, especially in order to create additional security against flow around the monolith 4.

In the left portion of the containment area 6, FIG. 1 shows the possibility of the inner shell 12 extending the entire length of the containment area 6. This is not critical for the thermal expansions. A spacer matting 16 may lie inbetween the shell 12 and the housing 2 with its heat insulating action, and the thermal conductance from the transitional region 8 along the thin inner shell 12 is slight.

On the other hand, FIG. 1 at the right shows the possibility of the inner shell 12 terminating slightly axially behind the end face of the monolith 4.

Figure 2:
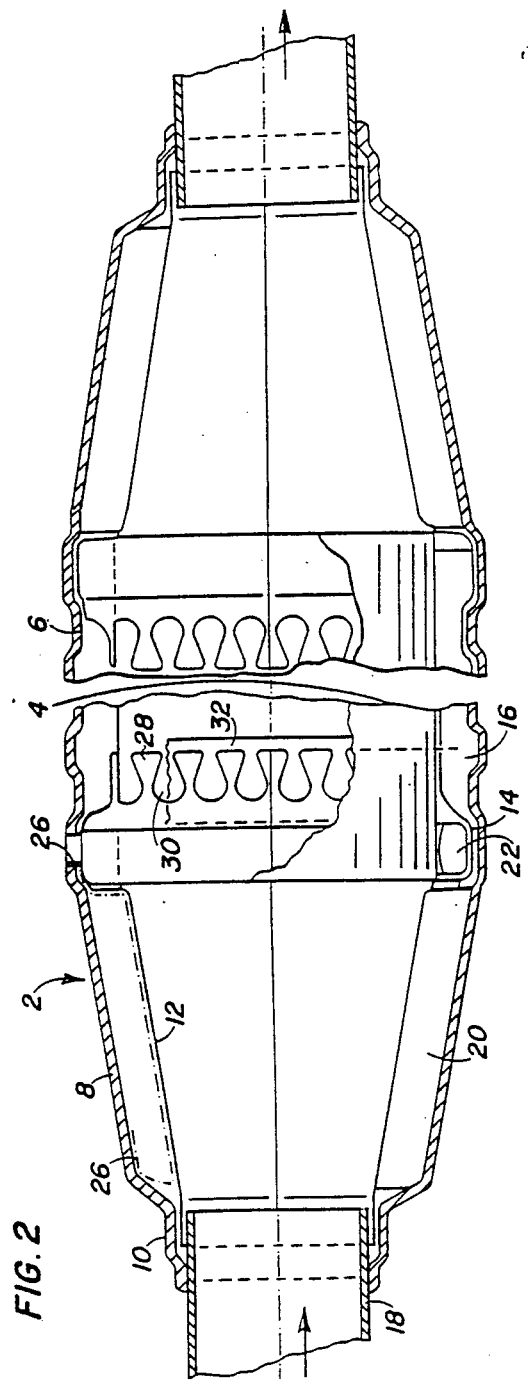
FIG. 2 is a view similar to FIG. 1 of another embodiment of the invention.

The examples illustrated in FIG. 2 correspond to those already explained, with the following changes:

In FIG. 2, top, the inner shell 12 is shown secured to the housing 2 by spot welds 26 distributed along the periphery at the start of the transitional region 8.

Furthermore, in FIG. 2 the first part of the inner shell 12 terminates behind the left end face of the monolith 4. In this terminal region of the first piece, the inner shell 12 has axially extending tongues 28, which are distributed along the periphery and are formed by omega-shaped punch-outs 30. The tongues 28 rest against the monolith 4 from the outside, or there may be an intermediate layer 32 inbetween, creating an extensive yet elastic support for the monolith 4. After the described fastening site with the spot welds 26, the inner shelf 12 is again led inwardly away from the housing 2, so that the tongues 28 rest directly or indirectly against the monolith 4 from the outside. This produces yet another sealing effect of a kind. The spacer matting 16 is led up from the middle of the monolith 4 to this diameter step.

In the middle region of the containment area 6 there is located the middle part 32 of the threefold inner shell 12. At either end, the middle part 32 is provided with tongues 28 and secured in the terminal region of the monolith 4 by crimped connections. Instead of the spot welds 24 shown in FIG. 2, there can be a simple crimped connection.

Both the insulating mat 20 and the spacer matting 16 preferably comprise ceramic fibers, which may be interspersed with fluffed mica.

The plate of the inner shell 12 is thinner and more temperature resistant than the plate of the housing 2. The inner shell 12 or portions thereof may be fashioned of half shells, as described for the housing 2.

While specific embodiments of the invention have been shown and described in detail to illustrate the application of the principles of the invention, it will be understood that the invention may be embodied otherwise without departing from such principles.

What is claimed is:

1. A device for cleaning gases exiting from a vehicle motor exhaust pipe, comprising an outer tubular housing having a first connection portion at one end and a second connection portion at the other end, each connection portion positioned and arranged to overlie and be connected to a part of the exhaust pipe; first and second transition portions of gradually increasing diameter extending radially outwardly of said first and second connection portions, respectively; a monolith portion connected at each end to each of said first and second transition portions at ends which are each remote from said first and second connection portions, respectively; a monolith in said monolith portion having a catalytically active coating and an end face; an inner shell of a temperature resistant plate metal in said housing spaced radially inwardly of the interior of said housing in each of said first and second transition portions, a spacer matting positioned between the interior of said housing and said monolith and comprising a material permitting variable thermal expansion of said housing and said monolith, said spacer matting having a side face protected by a protective layer, said inner shell having at least one end portion extending into said monolith portion with a base portion connected to said tubular housing and an end face portion overlapping portions of the monolith end face to maintain the monolith in position, securing means securing said inner shell base portion to said tubular housing at said monolith portion, said inner shell having another end portion adjacent said first and second connection portions which are free for thermal expansion.

2. A device according to claim 1, wherein said inner shell is made of a plurality of parts and wherein said at least one end portion extending into said monolith portion includes elastic tongues arranged in circumferentially spaced locations around the periphery thereof.

3. A device according to claim 2, wherein said tongues are formed of punched out portions of said shell in a shape of an omega Greek letter.

4. A device according to claim 1, including an insulating mat of an expandable material provided between said housing and said inner shell and located in said transitional portion.

5. A device according to claim 4, wherein said spacer matting disposed between said monolith and said interior of said housing, and said insulator mat disposed between said shell and said housing are both protected by said protective layer at end faces of each of said spacer matting and said insulator mat.

6. A device according to claim 5, wherein said inner shell overlaps said monolith in a marginal area adjacent said transitional portion.

7. A device according to claim 1, wherein said shell is in close sliding fit engagement with said housing at each end thereof and is engaged between said housing and the exhaust pipe.

8. A device according to claim 1, wherein there are two monoliths in said monolith portion arranged in axial succession.

9. A device according to claim 1, wherein said inner shell is made of three portions including a middle part being secured by a weld in said housing.

10. A device according to claim 9, wherein said middle part of said shell has a support region for two monoliths with peripherally distributed elastic tongues.

* * * * *